United States Patent [19]

Hsieh

[11] Patent Number: 4,944,326
[45] Date of Patent: Jul. 31, 1990

[54] INLET VALVE FOR WATER TANKS

[76] Inventor: Su Yueh Hsieh, No. 126, Hsi Lu St., Hsi Lu Li, Tien Chung Chen, Chang Hua Hsien, Taiwan

[21] Appl. No.: 404,458

[22] Filed: Sep. 8, 1989

[51] Int. Cl.⁵ .................... F16K 31/34; F16K 33/00
[52] U.S. Cl. .................... 137/414; 137/426; 137/430; 137/433
[58] Field of Search ............ 137/413, 414, 426, 430, 137/433

[56] References Cited

U.S. PATENT DOCUMENTS

| | | | |
|---|---|---|---|
| 1,074,327 | 9/1913 | Johnson | 137/426 |
| 1,589,786 | 6/1926 | Bradshaw | 137/413 |
| 1,915,716 | 6/1933 | Bradshaw | 137/413 |
| 4,342,328 | 8/1982 | Matta | 137/414 |

Primary Examiner—George L. Walton
Attorney, Agent, or Firm—Bacon & Thomas

[57] ABSTRACT

An inlet valve for a water tank includes a float, a housing, and a control device. The float is vertically slidable along the control device which has an adjusting mechanism and a retaining ring for respectively controlling the upper and the lower limits of the float. The housing is connected to a water supply and has a hole and two outlets provided for the water to flow into the water tank. The control device has a block element which can be actuated to block the hole of the housing. The adjusting mechanism can easily adjust the upper limit of the float relative to the control device so that the water level in the water tank can be adjusted easily.

3 Claims, 3 Drawing Sheets

INLET VALVE FOR WATER TANKS

BACKGROUND OF THE INVENTION

The present invention relates to a valve, and more particularly to an inlet valve for a water tank.

Normally, a ball float is pivotally connected to the inlet valve of a water tank by an extension rod to control the water flow into the water tank. The water volume of the water tank is fixed and can not be changed. Besides, a relative large space is required to accommodate the inlet valve and the extension rod.

The present invention has arisen to mitigate and/or obviate the afore described disadvantages of the conventional valves.

SUMMARY OF THE INVENTION

The primary objective of the present invention is to provide an inlet valve for water tanks which can change the water level of the water tank easily.

The present invention seeks to provide an inlet valve for a water tank including a float, a housing, and a control device. The float is vertically slidable along the control device which has an adjusting mechanism and a retaining ring for respectively controlling the upper and the lower limits of the float. The housing is connected to a water supply and has a hole and two outlets provided for the water to flow into the water tank. The control device has a block element which can be actuated by the float to block the hole of the housing. The adjusting mechanism can easily adjust the upper limit of the float relative to the control device so that the water level in the water tank can be adjusted easily.

Further objectives and advantages of the present invention will become apparent from a careful reading of the detailed description provided hereinbelow, with appropriate reference to the accompanying drawings.

DETAILED DESCRIPTION OF THE INVENTION

Figure 1:
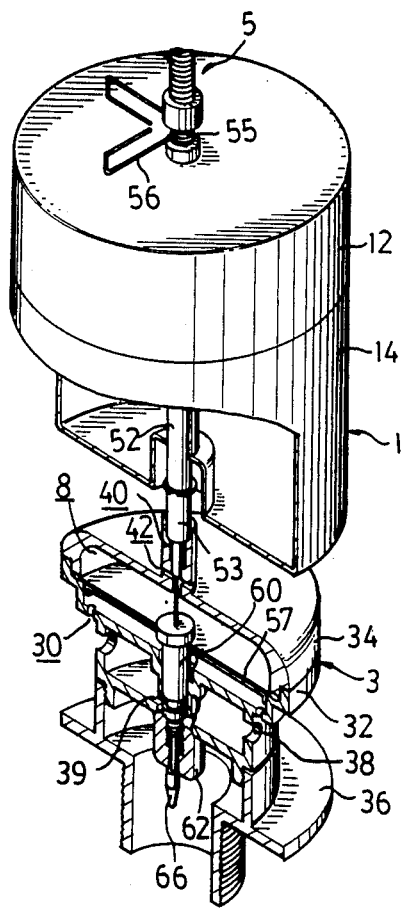
FIG. 1 is a perspective view of an inlet valve in accordance with the present invention in which partial of it is cut out.
Figure 2:
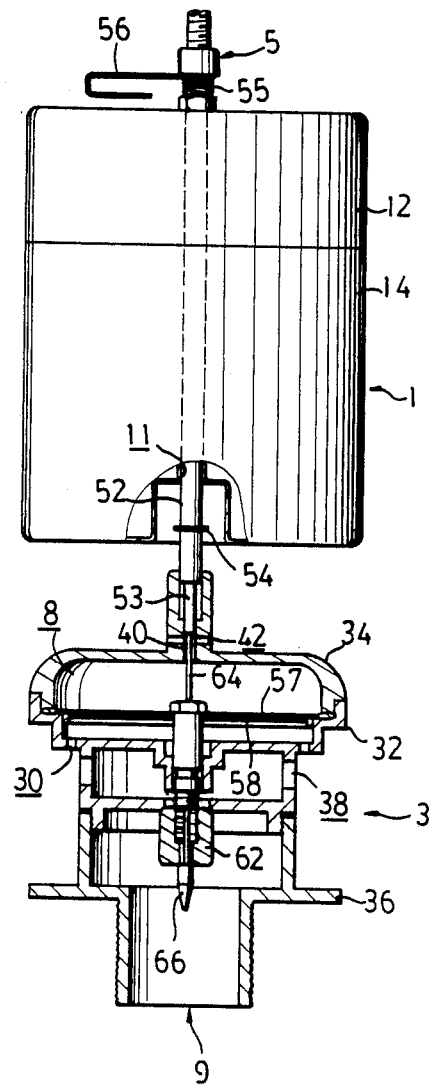
FIG. 2 is a partial cross sectional view of the inlet valve of FIG. 1, illustrating an operation of the inlet valve in accordance with the present invention.

Referring to the drawings and initially to FIGS. 1 and 2, the inlet valve for water tanks in accordance with the present invention comprises generally a float 1, a housing 3 and a control device 5 substantially extending through the float 1 and the housing 3.

The float 1 is generally a closed cylindrical housing with a hole 11 extending through its longitudinal center axis. The float 1 includes an upper part 12 and a lower part 14 connected together. A weight, such as water partially fills the float 1 to provide the float 1 a certain weight.

The housing 3 comprises generally a casing 32 with a cap 34 connected at a top end thereof and a connector 36 connected at a lower end thereof for connecting to a water supply. A center hole 37 with two inlets 39 is formed in the center of the casing 32. Two outlets 38 are formed in the outer wall of the casing 32. Two openings 30 are formed in the upper wall of the casing 32. A center hole 40 and two lateral holes 42 are formed in the center of the cap 34.

The control device 5 comprises a rod 52 extending through the center hole 11 of the float 1. A reduced diameter portion 53 which is slidable in the center hole 40 of the cap 34 is formed at a lower end of the rod 52. The outer diameter of the reduced diameter portion 53 is very close to but smaller than the inner diameter of the center hole 40 of the cap 34. A clamping ring 54 is clamped at a lower end of the rod 52. A coil spring 55 with both ends 56 bent as handles is provided on an upper part of the rod 52. The spring 55 is freely slidable on the rod 52 when the handles 56 are pressed by the fingers of a user; and the spring 55 is clamped on the rod 52 when the handles 56 are released. A rubber diaphragm or rubber sheet 57 and a disc 58 are disposed in the chamber between the casing 32 and the cap 34 in which the peripheral edge of the diaphragm 57 is clamped between the casing 32 and the cap 34. The center portion of the diaphragm 57 and the disc 58 are clamped on the upper end of a tube 60. The tube 60 extends through the center hole 37 of the casing 32. A plug 62 which is preferably made of rubber is connected at the lower end of the tube 60. A pin 64 with a head portion 66 formed at a lower end thereof is slidably extended through the plug 62 and the tube 60. A gap is formed between the pin 64 and the tube 60 and the plug 62. The upper end of the pin 64 is rigidly connected to the lower end of the reduced diameter portion 53 by such as force connection.

Referring again to FIGS. 1 and 2, the float 1 is buoyant on water. The rod 52 and the pin 64 are pulled up by the float 1. Therefore, the plug 62 is pulled up by the head portion 66 of the pin 64 to block the center hole 37 of the casing 32. Water can not flow into the water tank (not shown) at this moment.

Figure 3:
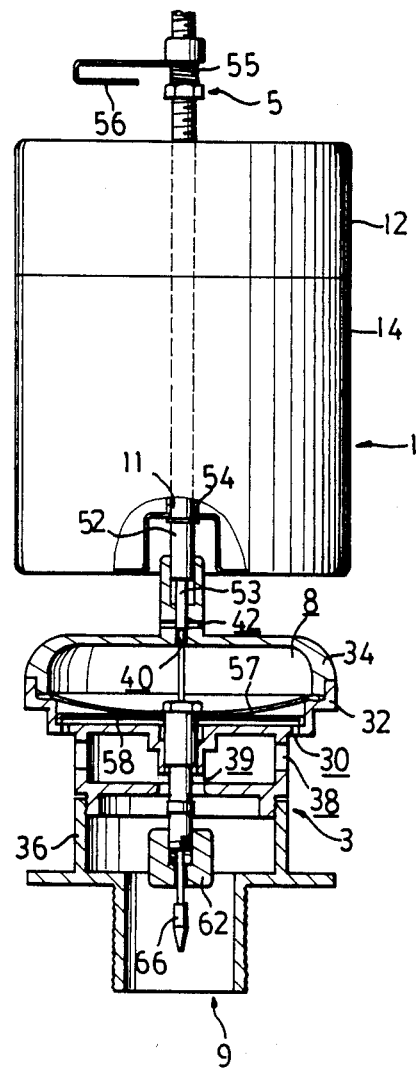
FIG. 3 is a partial cross sectional view similar to FIG. 2, illustrating another operation of the inlet valve in accordance with the present invention.

When the water is flowing out of the water tank, the float 1 is lowered. When the float 1 reaches the clamping ring 54, the pin 64 and the rod 52 are lowered by the weight of the float 1 so the the head portion 66 of the pin 64 is separated from the plug 62. The plug 62 still blocks the center hole 37 of the casing 32; and the reduced diameter portion 53 of the rod 52 is lowered to block the lateral holes 42 of the cap 34. Water flows from a water supply in the direction of the arrow 9 (FIG. 2), through the gap between the pin 64 and the plug 62 and the tube 60, into the chamber 8 between the cap 34 and the diaphragm 57. Since the lateral holes 42 are blocked, the water flows into the chamber 8 increases the pressure therein and pushes the diaphragm 57 and the tube 60 so that the plug 62 is lowered to open the center hole 37 of the casing 32 as shown in FIG. 3. The water flows through the center hole 37 and the inlets 39 and enters the water tank from the outlets 38. The float 1 is floated again. When the upper surface of the float 1 touches and pushes the spring 55, the rod 52, the pin 64, the plug 62 are pulled up by the float 1 until the plug 62 blocks the center hole 37 again. Water can freely flow into and out of the chamber between the disc 58 and the casing 32 by the openings 30.

Referring again to the drawings, the positions of the spring 55 on the rod 52 can be easily adjusted by pressing the handles 56. If the spring 55 is lowered relative to the rod 52, the water level and the water volume of the water tank is decreased. On the contrary, the water level of the water tank is increased when the spring 55 is adjusted higher relative to the rod 52 so that the level of the water tank can be changed easily.

Alternatively, the plug 62 is rigidly connected to the head portion 66 of the pin 64 so that the plug 62 can be actuated directly by the pin 64 to block and release the center hole 37 of the casing 32.

Accordingly, the present invention has the following advantages:

(a) The water volume of the water tank can be adjusted easily by moving the spring 55.
(b) The space for accommodating the inlet valve is relatively small.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An inlet valve for a water tank comprising a float having a hole extending in a longitudinal direction; a housing being disposed below said float, said housing including a casing, a cap being provided on a top end of said casing, and a connector being provided at a lower end for connecting to a water supply; an inlet and an outlet being formed in said casing, said inlet being formed in a lower center portion of said casing and said outlet communicating between an interior of said casing and said water tank; a center hole with at least one lateral hole being formed in a center of said cap, said lateral hole and said center hole, normally providing communication between said water tank and an interior of the cap; and a control device extending through said hole of said float, said center hole of said cap and said inlet of said casing; said float being movable up and down relative to said control device; said control device including means to block and open said lateral hole of said cap as the float moves up and down; a block element connected to a lower end of said control device and being actuated to block and release said inlet of said casing as the float moves up and down; means pushing said block element downward after said lateral hole is blocked; and a float level adjusting mechanism provided at an upper end of said control device wherein said adjusting mechanism comprises a coil spring coiled around a portion of the control device and having two ends extending from the coil spring as handles such that when the ends are squeezed together the coil spring is then freely movable with respect to the control device whereby when said handles are released said coil spring will become set at a selective position for adjusting an upper limit of said float relative to said control device for adjusting a water level in the tank.

2. An inlet valve asset forth in claim 1, wherein said control device comprises; a rod extending through said hole of said float; a retaining ring clamped on the rod below said float; adjusting mechanism is disposed at an upper end of said rod above the float; a lower end of said rod is slidable in said center hole of said cap; said lateral hole is blocked or opened by said lower end of said rod; an outer peripheral edge of a diaphragm is clamped between said cap and said casing, said diaphragm dividing said casing into an upper chamber and a lower chamber; a disc is disposed beneath said diaphragm; said lateral hole and said center hole normally providing communication between said upper chamber and said water tank; means providing communication between said lower chamber and said tank; a tube slidable in said inlet of said casing and fixed at a center portion of said diaphragm and said disc; said block element includes a plug having a center hole fixed at a lower end of said tube and being located below said inlet of said casing to block and open the inlet; a pin slidably extending through said center hole of said plug and said tube, having an upper end connected to said lower end of said rod, a head portion formed at a lower end and being actuated to block and open said center hole of said plug; such that water from said water supply flows through said inlet and said outlet into said water tank when said inlet is not blocked by said plug; water from said water supply flows through said center hole of said plug and said tube into said upper chamber, and flows into said water tank from said lateral hole when said center hole of said plug is not blocked by said head portion of said pin; and the pressure in said upper chamber is increased when said lateral hole is blocked by said lower end of said rod, and when said center hole of said plug is released by said head portion of said pin so that said tube, said diaphragm and said plug are pushed downward and so that said inlet of said housing is opened by downward movement of said plug.

3. An inlet valve as set forth in claim 2, wherein said plug is made of rubber.

* * * * *